March 28, 1939.  C. DORNIER  2,152,033
BALANCING SYSTEM
Filed Nov. 30, 1937
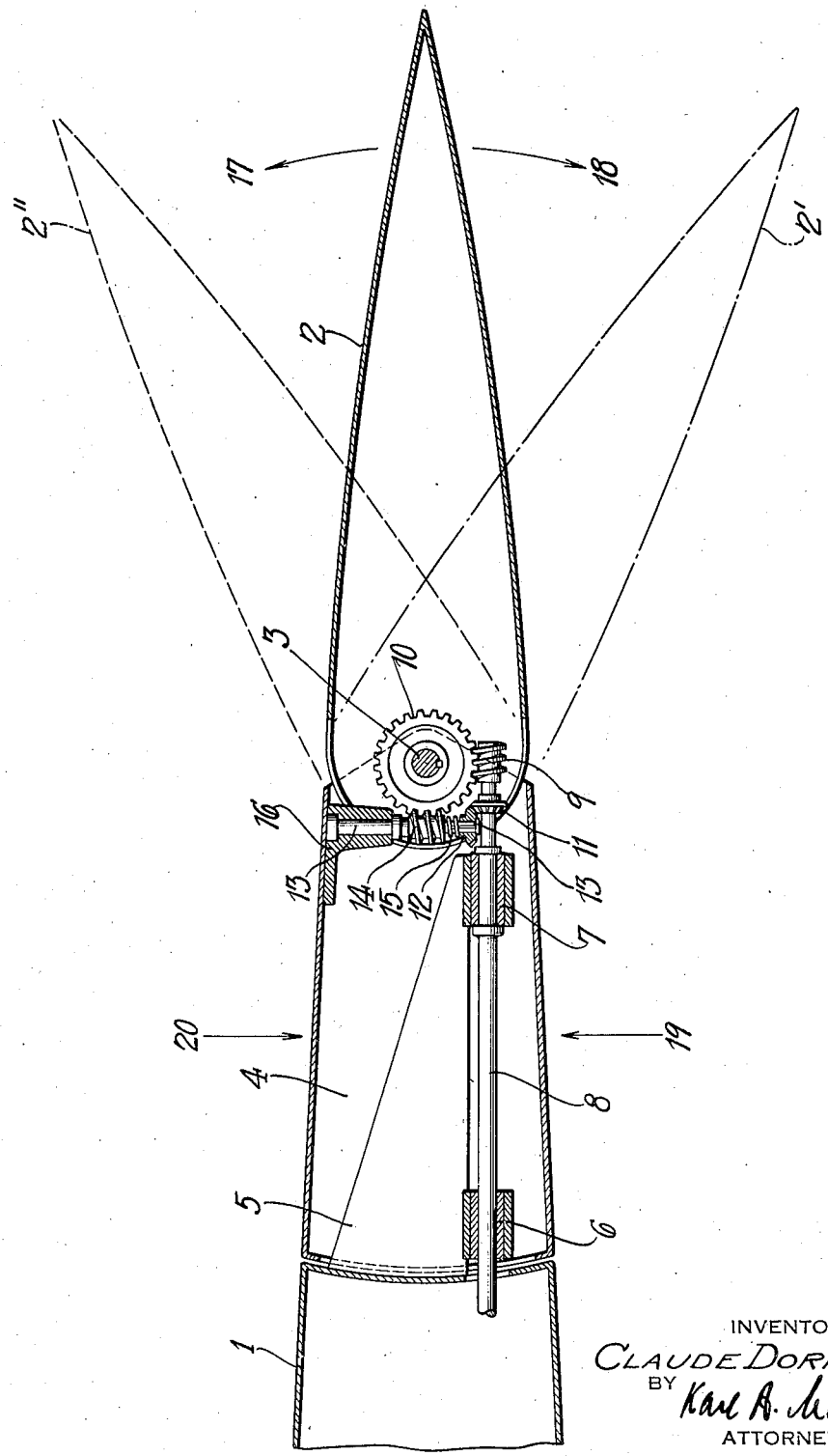
INVENTOR
CLAUDE DORNIER.
BY Karl A. Mayr
ATTORNEY Patented Mar. 28, 1939

2,152,033

UNITED STATES PATENT OFFICE 2,152,033

BALANCING SYSTEM

Claude Dornier, Friedrichshafen-on-the-Bodensee, Germany, assignor of one-half to Dornier-Werke G. m. b. H., Friedrichshafen-on-the-Bodensee, Germany Application November 30, 1937, Serial No. 177,189
In Germany December 5, 1936

15 Claims. (Cl. 244—42)

The present invention relates to a balancing system for rudders and flaps for balancing and easing the operation of said rudders or flaps, more particularly to a system for balancing the landing ailerons in aircraft, more particularly in airplanes.

An object of the present invention is the provision of stabilizers of the type specified which are of such configuration as not to cause any aerodynamic disadvantages and/or undesired increase of weight.

The landing ailerons in airplanes must be turned 60° and more in order to be effective. Operation of such ailerons, therefore, requires considerable power if they are not balanced. Usually balancing is effected by arranging the axis of revolution at a considerable distance from the front end of the aileron. When dipping the rear part of the aileron the front part rises above the adjacent wing surface. Thereby, however, the air flow on the top surface of the wing is disturbed. Stabilizers which are linked to the rear of the rudder cause a displacement of the center of gravity towards the rear which is not desired. To reduce vibration it is essential that the center of gravity of the rudder coincides with the axis of rotation of the rudder. As this can practically very seldom be realized balancing weights have been provided in front of said axis. With respect to the vibration problem balancing weights are not desirable; the increase of weight caused by the counterweights which cannot be put to other uses is also undesirable.

All these disadvantages are overcome by the present invention. According to the present invention the aileron or rudder is made up of two or more parts and a balancing part is associated with the rudder proper which balancing part does not project or very seldom projects beyond the wing surfaces. The balancing part is disposed directly ahead of the rudder proper so that the accumulation and banking up of the air caused by the deflection of the flap or rudder tends to press the balancing flap or the stabilizer out of its rest position. The rudder proper and the stabilizer are connected with one another by means of a self locking gear. In case the rudder is moved the stabilizer is not moved out of the rest position which is within the wing profile, but it is affected on one side by the banked up air which works against the movement of the rudder. The locking gear transmits the pressure acting on the balancing flap to the rudder proper, whereby the operating mechanism of the latter is relieved. Depending on the specific design the balancing flap may thereby project somewhat, however, very little beyond the wing profile. The self locking device does not cause any resistance to the return movement of the rudder. At the moment of said return movement the rudder is not suddenly freed from any counteraction so that it swings back into rest position under the influence of the air current without any resistance. The self locking gear which locks in one direction only may be a gear comprising a spring loaded pawl and a ratchet wheel. In this case the pawl must be actuated by the operator before the rudder is moved back into its rest position. It is better to unite the self locking device with the operating mechanism of the rudder to form a self locking operating mechanism which acts in both directions.

Instead of one balancing flap a plurality of flaps may be provided in which case the above described mechanism is modified accordingly. The rudder proper and the balancing flap associated therewith can be arranged revolvable about the same axis or about different axes.

Further and other objects of the present invention will be hereinafter set forth in the accompanying specification and claims and shown in the drawing which, by way of illustration, show what I now consider to be a preferred embodiment of my invention.

In the drawing, by way of example, one embodiment of the invention is shown.

The drawing shows, in cross section, a rudder which may be moved in two directions from its neutral position. This embodiment of the present invention is particularly suitable for balancing the rudder and the elevator. In the rear of the fin or wing 1, a rudder is arranged which comprises parts 2 and 4 which are revolvable about the axis 3. Fin 1 carries an outrigger 5 which carries the bearings 6 and 7 for the drive shaft 8. The curved face of the flap part 4 is provided with a cut away into which the arm or outrigger 5 extends. Shaft 8 carries the drive worm 9 which engages the worm wheel 10 which is rigidly connected with the shaft 3. Rigidly connected with shaft 3 is part 2 which represents the rudder proper. Depending on the direction of rotation of drive shaft 8, part 2 is deflected in the direction of arrow 17 or 18. Also rigidly connected with shaft 8 is the bevil gear wheel 11 which engages the bevil gear wheel 12. The latter cannot rotate on shaft 13 but is axially movable on said shaft. Rigidly connected with shaft 13 is the worm 14. Wheel 12 is pressed towards wheel 11 by means of a spring 15 which rests against the worm 14. Wheels 11 and 12 are of same size. Worm 14 is turned therefore at the same speed as is shaft 8 and worm 9. Worm 14 or rather shaft 13 is revolvably carried by the bearing 16 which is rigidly connected with part 4. Whereas worm 9 serves for driving the rudder part 2, worm 14 serves as self locking gear connecting parts 2 and 4. Provision of the two worms 9 and 14 together with the bevil gear system 11—12 assures unmovability of part 4, whereby drive shaft 8 is subjected to axial tension or pressure only and never to bending forces.

If the shaft 8 and with it worm 9 is turned in one or the other direction, worm 14 rotates at the same time at the same speed as worm 9. Consequently worm wheel 10 is revolved whereby worm 14 retains its position; rudder part 4 is always held in its position by means of the simultaneously rotating worm 14 no matter whether the rudder proper 2 carries out a movement in one or the other direction or remains in its neutral position. If rudder 2 is deflected, for example, into the position 2' the resulting stemming of the air presses on part 4 in the direction of the arrow 19. Part 4 cannot leave its original position because worm gear 14—10—9 is self locking; the pressure acting on part 4, however, is transmitted by means of the worm gear to part 2 in the direction of the arrow 18 and relieves the driving mechanism for the rudder by reducing the pressure between parts 9 and 10. When part 2 is deflected in opposite direction, for example, into the position 2'' pressure is exerted on part 4 in the direction of arrow 20 which pressure is transferred to part 2 by means of the self locking worm gear and acts on part 2 in the direction of arrow 17 whereby the drive mechanism is also relieved. When pressure acts on part 4 in the direction of arrow 20 spring 15 prevents that part of the pressure acts through the bevil gear wheel 12 on wheel 11 and thereby on the drive shaft 8.

While I believe the above described embodiments of my invention to be preferred embodiments, I wish it to be understood that I do not desire to be limited to the exact details of design and construction shown and described, for obvious modifications will occur to a person skilled in the art.

I claim:

1. A rudder system comprising a rudder proper, an auxiliary rudder, a self locking gear interconnecting both said rudders, said gear comprising operating means connected with and for operating said rudder proper and relief means connected with and operated by said auxiliary rudder and engaging said operating means and reducing the power required for operating said operating means.

2. An adjustable wing system comprising an adjustable wing, an auxiliary wing, operating means connected with and operating said adjustable wing, relief means connected with said auxiliary wing and engaging said operating means and transmitting pressure exerted on said auxiliary wing to said operating means, whereby the resistance to the operation of said operating means and adjustable wing is reduced.

3. An adjustable wing system comprising an adjustable wing, an auxiliary wing, an axis of rotation common to both said wings, operating means connected with and operating said adjustable wing, relief means connected with said auxiliary wing and engaging said operating means and transmitting pressure exerted on said auxiliary wing to said operating means, whereby the resistance to the operation of said operating means and adjustable wings is reduced.

4. An adjustable wing system comprising an adjustable wing, an auxiliary wing, a shaft rigidly connected to said adjustable wing and revolvably supporting said auxiliary wing, operating means connected with said shaft, relief means connected with said auxiliary wing and being adapted to engage said operating means and to transmit pressure exerted on said auxiliary wing to said operating means, whereby the resistance to the operation of said operating means and adjustable wing is reduced.

5. An adjustable wing system comprising an adjustable wing, an auxiliary wing, an axis of rotation common to both said wings, a connecting gear interconnecting both said wings and being self-locking in both directions of movement of said wings about said axis and comprising operating means for operating said adjustable wing.

6. An adjustable wing system which forms the continuation of a stationary wing, said system comprising an adjustable wing, an auxiliary wing, both of said last mentioned wings being swingable about the same axis of rotation, and connecting means interconnecting both of said last mentioned wings and forming the operating means for said adjustable wing.

7. An adjustable wing system which forms the continuation of a stationary wing, said system comprising an adjustable wing, an auxiliary wing which is situated in between said stationary wing and said adjustable wing, said auxiliary and said adjustable wing being swingable about the same axis of rotation, and connecting means interconnecting both of said last mentioned wings and forming the operating means for said adjustable wing.

8. An adjustable wing system which forms the continuation of a stationary wing, said system comprising an adjustable wing, an auxiliary wing which is situated in between said stationary wing and said adjustable wing, said auxiliary and said adjustable wing being swingable about the same axis of rotation, connecting means interconnecting both said last mentioned wings and forming operating means for operating said adjustable means and being adapted to hold said auxiliary wing in position in which it forms the continuation of said stationary wing when said adjustable wing is deflected out of its neutral position.

9. An adjustable wing system which forms the continuation of a stationary wing, said system comprising an adjustable wing, an auxiliary wing, both of said last mentioned wings being swingable about the same axis of rotation, connecting means interconnecting both of said last mentioned wings and forming the operating means for said adjustable wing, and an extension connected with said stationary wing and extending into said auxiliary wing and supporting part of said connecting means.

10. An adjustable wing system comprising an adjustable wing, an auxiliary wing, both of said last mentioned wings being swingable about the same axis of rotation, connecting means interconnecting both of said last mentioned wings and forming the operating means for said adjustable wing, said connecting means comprising drive means which are supported by said stationary wing and by said auxiliary wing and driven means which rotate about said common axis of rotation.

11. An adjustable wing system comprising an adjustable wing, an auxiliary wing, both of said last mentioned wings being swingable about the same axis of rotation, connecting means interconnecting both of said last mentioned wings and forming the operating means for said adjustable wing, said connecting means comprising drive means which are supported by said stationary wing and by said auxiliary wing and driven means which rotate about said common axis of rotation, said drive means including two drive members and a resilient interconnection between said two members.

12. An adjustable wing system comprising an adjustable wing, an auxiliary wing, a shaft connected with said adjustable wing and revolvably supporting said auxiliary wing, a worm wheel fixed to said shaft, a drive shaft carrying a worm wheel engaging said worm wheel and carrying a bevil gear wheel, an auxiliary shaft revolvably supported by said auxiliary wing and carrying a bevil gear wheel which engages said first mentioned bevil gear wheel and carrying a worm which engages said worm wheel.

13. An adjustable wing system comprising an adjustable wing, an auxiliary wing, a shaft connected with said adjustable wing and revolvably supporting said auxiliary wing, a worm wheel fixed to said shaft, a drive shaft carrying a worm wheel engaging said worm wheel and carrying a bevil gear wheel, an auxiliary shaft revolvably supported by said auxiliary wing, an auxiliary bevil gear wheel carried by and being axially movable, but not rotatable with respect to said auxiliary shaft and engaging said first mentioned bevil gear wheel, and a worm supported by said auxiliary shaft and engaging said worm wheel.

14. An adjustable wing system comprising an adjustable wing, an auxiliary wing, a shaft connected with said adjustable wing and revolvably supporting said auxiliary wing, a worm wheel fixed to said shaft, a drive shaft carrying a worm wheel engaging said worm wheel and carrying a bevil gear wheel, an auxiliary shaft revolvably supported by said auxiliary wing, an auxiliary bevil gear wheel carried by and being axially movable, but not rotatable with respect to said auxiliary shaft and engaging said first mentioned bevil gear wheel, a worm supported by said auxiliary shaft and engaging said worm wheel, and a resilient means disposed in between said last mentioned worm and said auxiliary bevil gear wheel and resiliently pressing said auxiliary bevil gear wheel to said first mentioned bevil gear wheel.

15. An adjustable wing system comprising an adjustable wing, an auxiliary wing, a shaft connected with said adjustable wing and revolvably supporting said auxiliary wing, a worm wheel fixed to said shaft, a drive shaft carrying a worm wheel engaging said worm wheel and carrying a bevil gear wheel, an auxiliary shaft revolvably supported by said auxiliary wing, an auxiliary bevil gear wheel carried by and being axially movable, but not rotatable with respect to said auxiliary shaft and engaging said first mentioned bevil gear wheel, a worm supported by said auxiliary shaft and engaging said worm wheel, and a resilient means connected with said auxiliary bevil gear wheel and resiliently pressing said auxiliary bevil gear wheel to said first mentioned bevil gear wheel.

CLAUDE DORNIER.